March 23, 1965 H. DE LANG 3,175,093
PHOTOSENSITIVE DEVICE FOR DIGITAL MEASUREMENT OF THE
DISPLACEMENT OF AN OBJECT
Filed May 25, 1961 3 Sheets-Sheet 2
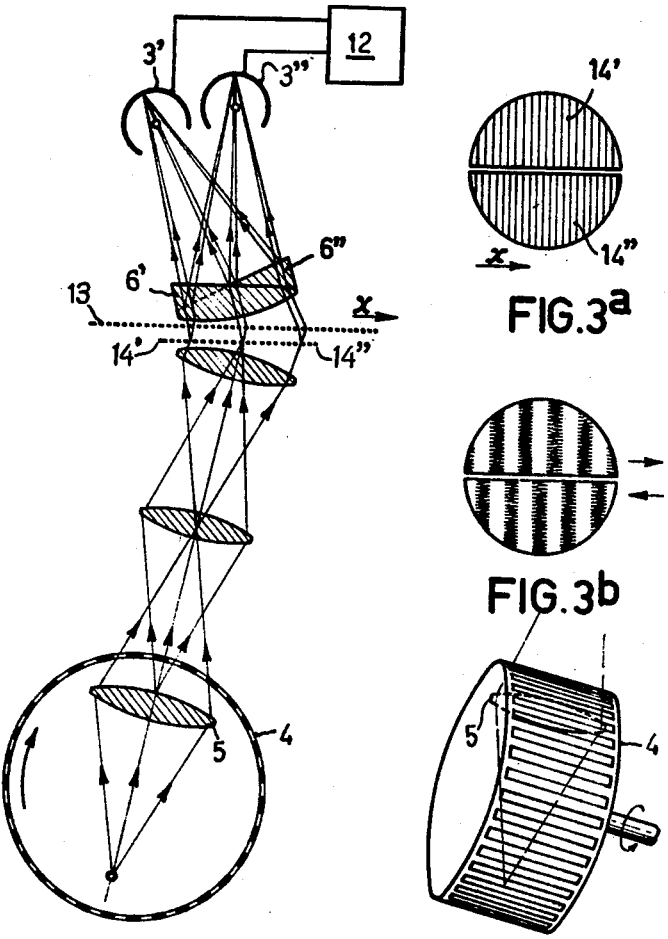
FIG. 3
FIG. 3a
FIG. 3b
FIG. 4
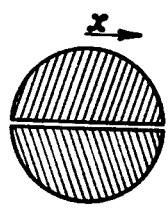
FIG. 4a
FIG. 4b
INVENTOR
HENDRIK DE LANG.
BY
AGENT

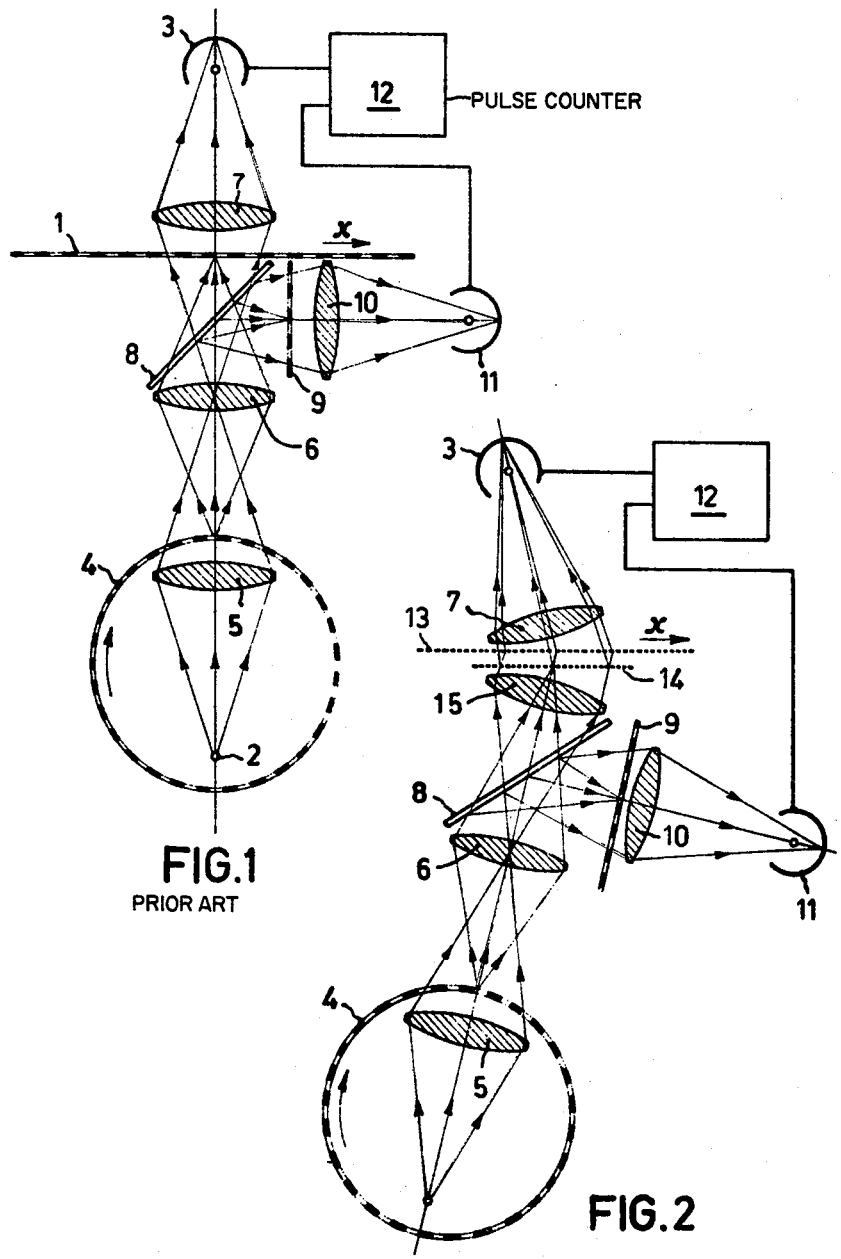

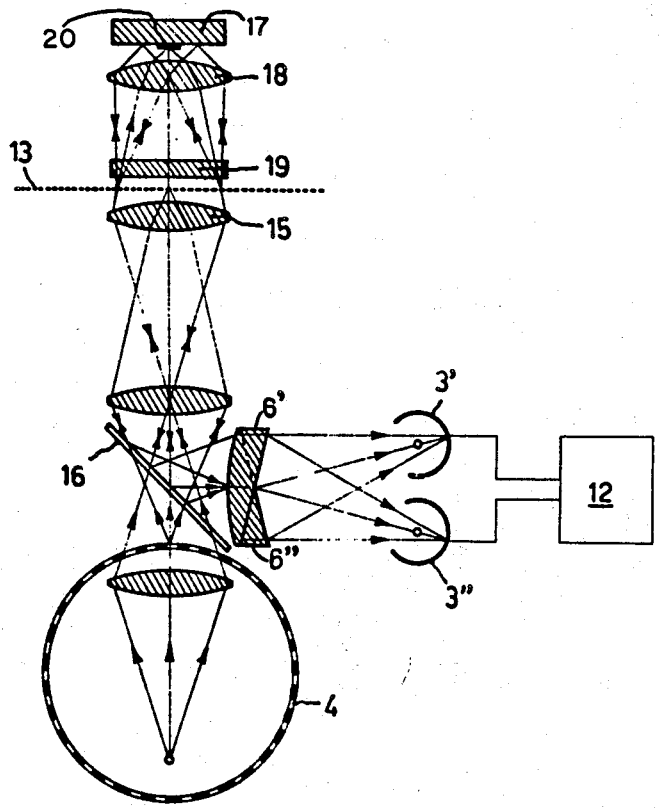
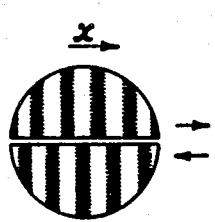
FIG.5a
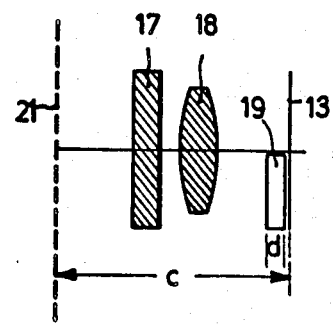
FIG.5b
FIG.5
INVENTOR
HENDRIK DE LANG.

United States Patent Office 3,175,093
Patented Mar. 23, 1965

3,175,093
PHOTOSENSITIVE DEVICE FOR DIGITAL MEASUREMENT OF THE DISPLACEMENT OF AN OBJECT
Hendrik de Lang, Emmasingel, Eindhoven, Netherlands, assignor to North American Philips Company, Inc., New York, N.Y., a corporation of Delaware
Filed May 25, 1961, Ser. No. 112,731
Claims priority, application Netherlands, June 25, 1960, 253,087
13 Claims. (Cl. 250—237)

The invention relates to a device for the digital measurement of the displacement of an object relative to a further object, in which use is made of a grating which is displaced together with the object, of a source of light and a photo-electric element, in which during the displacement, owing to the co-operation with the source of light and the grating, a period signal is produced, of which the number of periods depends upon the magnitude of the displacement. By counting these signals in a counter such as described in U.S. Patent 2,861,345 the displacement is measured. Such displacements occur for example in machine-tools such as drilling machines, milling machines or the like.

In order to obtain an indication of the direction of the displacement it is known to cause the movable grating to cooperate with a stationary grating, which has a grating period (the pitch or distance between two adjacent opaque lines) slightly differing from that of the former or which is at a small angle to the former so that a so-called Moiré pattern is formed, which produces, in two or more photo-electric cells, signals of which the phase difference depends upon the sense of movement of the first grating.

The device may be such that the signal voltage varies approximately sinusoidally with time, while the number of zero passages is counted in a counter. Use may be made in this case of an electronic counter with bistable mulitivibrators. A more accurate determination may then be obtained by interpolation.

In accordance with a further known proposal the direction of the displacement may be determined by means of a reference signal of fixed frequency, which is derived from a drum rotating at a constant speed. This drum is also provided with a grating located in the path of the luminous rays, this grating co-operating with the first or displaceable grating via an optical system so that the number of signal periods produced during the drum rotation depends, in addition to movement of displaced grate upon the speed of revolution and the sense of rotation of the drum. Such a known device is shown in FIG. 1 of the drawing.

FIG. 1 is a schematic illustration of a known displacement measuring apparatus of the type described.

FIG. 2 is a schematic representation of an improved displacement measuring apparatus according to one embodiment of this invention.

FIG. 3 is another schematic representation of another schematic representation of another embodiment of displacement measuring apparatus according to this invention.

FIG. 3a is a plan view of a grating according to this invention and FIG. 3b is an illustration of an interference pattern produced in accordance with the invention utilizing the grating of FIG. 3a.

FIG. 4 is a side elevation view of a rotatable drum grating utilized in conjunction with a modified arrangement according to FIG. 3.

FIG. 4a illustrates a grating used with the modified arrangement of FIG. 3 and FIG. 4b is an illustration of the interference pattern produced by said modification.

FIG. 5 is a further schematic illustration of a presently preferred modification according to this invention; FIG. 5a illustrating the interference pattern produced by the arrangement of FIG. 5, and FIG. 5b is another view of a portion of FIG. 5 showing the relationship of the elements illustrated.

Referring to FIG. 1 reference numeral 1 designates the displaceable grating and 2 a source of light, of which the rays are incident to a photo-electric cell 3 via a plurality of optical systems and the grating 1. The light source 2 is arranged inside a drum 4 having a constant angular velocity provided at the circumference with a grating. The drum is rotatable about an axis at right angles to the plane of the drawing and the grating lines, as those of the grating 1, are orthogonal to the plane of the drawing.

By means of a first optical system 5 an image of the light source 2 is formed at the area of a second optical system 6; the rays emanating from the system 5 pass through the drum grating 4. The optical system 6 producing an image of the drum grating on the grating 1 and the rays emanating from the system 6 pass partly through the semi-pervious mirror 8 and are partly reflected thereby. The reflected rays produce an image of the drum grating 4 on a third, stationary grating 9, of which the grating lines are also orthogonal to the plane of the drawing. The images of the drum grating have the same grating period as the gratings 1 and 9 on which the drum images are produced.

The optical system 7 produces an image on the photo-electric element 3. The optical system 10 also produces an image on the photo-electric element 11. It is obvious that in the said photo-electric elements periodical signals are produced. If the grating 1 does not move, the repetition frequency of these two signals is the same and is solely determined by the speed of revolution of the drum 4 and the period of the drum grating. However, if the grating 1 moves in the direction of the arrow $x$, i.e., in the direction opposite to movement of the grating line of the drum 4 along the grating 1, the fundamental harmonic of the signal in the element 3 is given by:

$$S_1 = C \sin \left( \omega t + 2\pi \frac{x}{p} \right)$$

wherein $C$ is a constant, $\omega$ the signal frequency determined by the speed of revolution of the drum and the grating period thereof, i.e., the pitch or the distance between two subsequent lines, $x$ the magnitude of the displacement and $p$ the period of the grating 1.

The signal in the element 11 depends solely upon the speed of revolution of the drum 4 and is given by $S_0 = C' \sin \omega t$. By pulse counting in a suitable pulse counter, for example, a counter described in U.S. Patent 2,861,-345 which counts two series of pulse, the difference between the counts will indicate the value of $x$. This value may be positive or negative. It is easy to construct the device so that counting is carried out in a positive or a negative sense in accordance with the direction of the displacement of the grating 1.

One advantage of this device resides in that use may be made of an alternating voltage for the amplification of the signals, since even in the rest position of the grating 1 alternating currents are produced in the elements 3 and 11.

The device described has a disadvantage in that the movable grating must have a comparatively great period i.e. the space between grate bars is comparatively large, since otherwise the production of the image of the drum grating 4 on the further gratings involves a loss of signal amplitude and resultant difficulties. Consequently, if a more accurate measurement is desired, it will always be necessary to design the known arrangement so that interpolation is possible. The invention has for its object to eliminate this disadvantage, i.e. more accurate measurement without interpolation.

The invention consists in that the drum grating image is reproduced by optical means on an interference pattern derived from the first grating (the drum grating can be caused to coincide with the interference pattern) and the light fluctuations produced by the co-operation of the drum grating and the interference pattern are detected and the alternating voltage obtained is compared in phase with a further alternating voltage derived from the drum grating alone.

Since basically an interference pattern is used, the grating period may be chosen considerably smaller than in the known arrangement, so that the accuracy becomes proportionally greater.

The interference pattern may be formed in any suitable manner for instance by means of a second grating, of which the period is slightly different from that of the first or moving grating or of which the grating lines are at a small angle to the grating lines of the moving grating.

FIG. 2 illustrates one embodiment of the invention. Corresponding parts are designated by the same reference numerals as seen in FIG. 1.

The device is distinguished from that shown in FIG. 1 mainly in that apart from the movable grating denoted by 13 provision is made of a second grating 14, which is stationary relative to the first grating 13 and in that the grating periods of these two gratings, which are shown as refraction gratings, are chosen to be much smaller than the period of the grating 1 in FIG. 1. This offers, moreover, the possibility of utilizing the diffraction of the luminous rays by these gratings 13 and 14 and the obtained diffraction maxima the rays of two of which are indicated by arrows. The periods of the gratings 4 and 9 are the same as before. Provision is furthermore made of an additional optical system 15, which is intended to render the rays which have passed through the mirror parallel to each other (collimator). The grating 14 is spaced at a small distance from the grating 13, the grating lines being parallel to each other; the grating period differs, for example, a few percent from that of the grating 13. The grating period of grating 13 may be of the order of 10 microns.

The axes of the optical systems 5, 6 and 15 are at a small angle to the plane perpendicular to the gratings 13 and 14. It is thus possible to make use of, for example, the diffraction maxima of the order 0 and 1. The figure illustrates the course of the corresponding rays between the grating 14 and the cell 3. The system 7 produces an image at the photo-electric cell 3, which image consists of the image of the drum grating formed in the plane of gratings 13 and 14, and owing to the different grating periods of grates 13 and 14 a Moiré pattern is produced, which pattern produces light fluctuations in the photo-electric cell 3. In the cell 11 a periodical signal is again produced by the drum grating, which depends solely upon the speed of revolution of the drum. The period signals of the two cells 3 and 11 contain, together, the information permitting determination of the magnitude and the direction of displacement $x$ of grate 13. The two signals are given by:

$$S_1 = C \sin\left(\omega t + 2\pi \frac{x}{p'}\right)$$

and $S_0 = C' \sin \omega t$. Herein $p'$ designates the grating period of the movable grating 13. It is supposed that the grating period of the grating 14 exceeds that of the grating 13, while the grating period of the drum is equal to the period of the interference pattern thus produced. The period of the drum grating may remain of the same order of magnitude as before, but accuracy is determined by the period of the moving grating 13, which period is in this case much lower.

FIG. 3 illustrates an embodiment based on the same principle, in which use is made of two auxiliary gratings, illustrated in FIG. 3, in the image field. Thus, the grating 14 of FIG. 2 is replaced by a grating consisting of the parts 14' and 14". The grating period of the first part 14' is slightly greater and the second part 14" is slightly smaller than the grating period of the movable grating 13. The photo-electric cell 11, the mirror 8, grating 9 and the optical system 10 may now be dispensed with; the cell 3, however, is replaced by two cells 3' and 3", which capture the light rays from the grating parts 14' and 14" respectively. The separation between the parts 14', 14" is parallel to the plane of the drawing in FIG. 3.

In this embodiment two interference patterns are formed at the areas of the gratings 13, 14' and 14", as is indicated in FIG. 3b, which patterns move in opposite directions and cause current pulses in the cells 3' and 3" from which, in the device 12, an indication of the extent and direction of the displacement is derived. The upper part of the pattern, FIG. 3b, will move in the same sense as the grating 13 and the lower part will move in an opposite sense. In order to produce the images on the two photoelectric elements use is made of two optical systems 6' and 6", co-operating with the gratings, each system comprising a lens and a prism, which may be integral with each other. It is thus ensured that the images are produced at points separated from each other in space.

The signals at the cells 3' and 3" are now given by $$S_1 = C \sin\left(\omega t + 2\pi \frac{x}{p'}\right); \quad S_2 = C \sin\left(\omega t - 2\pi \frac{x}{p'}\right)$$

These signals contain again the required information to determine the magnitude and the direction of displacement. They are supplied to a known pulse counter device 12, which processes this information.

Instead of using grating parts of which the grating periods are slightly different, use may be made of grating parts having the same period but having lines which are at a small angle to the grating lines of the movable grating, the inclination of the lines of the two parts being opposite one another. Such an embodiment is shown in FIG. 4a. The associated interference pattern is shaped in the form shown in FIG. 4b; the direction of movement of the Moiré lines, upon a displacement of the movable grating in a positive sense, is indicated by the arrows. The cells 3', 3" are of course positioned such that again pulse currents are generated.

Since the Moiré lines in this case are approximately orthogonal to the grating 13 lines of the movable grating, it is also necessary in this embodiment to arrange the lines of the drum grating at right angles to the lines of the movable grating. Consequently, the drum is to be arranged, as is shown in FIG. 4, so that the axis of rotation lies in the plane of the drawing.

One embodiment in which an interference pattern is formed with the aid of a single movable grating, which is in itself reproduced, is illustrated in FIG. 5. The rays passing through the grating 13 again form diffraction maxima, of which those of the magnitudes $+1$ and $-1$ are used for reproduction. To this end the grating 13 is designed as a diffraction grating with a great intensity in the $+1$ and $-1$ orders, the intensity in the O-order may be small. The maximum of the O-order is suppressed if it is not yet sufficiently weak by providing the mirror 17 with a dark part 20 in the center. In front of the mirror is arranged an optical system 18, by means of which the image of the grating per se is produced. The course of the rays is shown in the upper part of FIG. 5.

In order to obtain the electrical signals, provision is furthermore made of a semi-pervious mirror 16, which projects the returning rays via a prismatic lens system of the same form as the system 6', 6" of FIG. 3 onto the photo-electric cells 3', 3".

In order to obtain two interference patterns moving in relatively opposite senses, provision is made, in the lower half of the visual field of a planoparallel plate 19 of transparent material, which produces such a refraction of the rays in this part of the field that a Moiré pattern of the shape shown in FIG. 5a is obtained.

FIG. 5b shows a different elevation of the FIG. 5 embodiment. The main plane of the optical system formed by the objective 18 and the mirror 17 is designated by 21.

The Moiré period is given in this case approximately by:

$$\frac{1}{2} \cdot \frac{c}{d} \cdot \frac{n}{n-1} \cdot p'$$

wherein $c$ designates the distance between the grating 13 and the main plane 21, $d$ the thickness of the planoparallel plate 19 and $n$ the refractive index of plate 19.

The two grating halves are reproduced on the photoelectric cells and produce therein sinusoidal signals of the waveform:

$$S_1 = C_1 \sin\left(\omega t + 2\pi \frac{x}{\frac{1}{4}p'}\right); \quad S_2 = C_1 \sin\left(\omega t - 2\pi \frac{x}{\frac{1}{4}p'}\right)$$

In the device shown in FIG. 3 the increase in accuracy with respect to the device of FIG. 2 equals a factor 2, an eightfold increase in accuracy is attained in the device shown in FIG. 5 over the arrangement of FIG. 2.

What is claimed is:

1. Apparatus for measuring displacement of an object comprising a grating member secured to said object and displaceable therewith, means for producing a moving light pattern, means projecting an image of said moving light pattern for producing a first light beam, means including said grating member for producing an interference pattern, means projecting said first light beam onto said means for producing an interference pattern for producting a second light beam, and means including photoelectric means for detecting said first and second light beams.

2. Apparatus according to claim 1 wherein said means for producing a moving light pattern comprises a hollow drum grating mounted for rotation and driven at a constant angular velocity, a light source within said drum and an objective lens within said drum between said light source and the drum grating; and said means for producing said interference pattern comprises a second grating member optically coupled in juxtaposition with the first mentioned grating member and having a period differing from the period of said first mentioned grating member.

3. Apparatus according to claim 2 wherein said second grating member is inclined relative to said first mentioned grating.

4. Apparatus according to claim 3 wherein said first mentioned grating member and second grating member have diffraction gratings thereon.

5. Apparatus according to claim 2 wherein said second grating member for producing said interference pattern comprises first and second grating parts, one said grating part having a grating period larger than the grating period of said first mentioned grating member and the other of said grating parts have a grating period smaller than said first mentioned grating member.

6. Apparatus according to claim 5 wherein the image of said moving light pattern is projected onto both of said first and second grating parts for producing said first and second light beams.

7. Apparatus according to claim 5 wherein said first and second grating parts are inclined with respect to said first mentioned grating.

8. Apparatus according to claim 1 wherein said means for producing said interference pattern comprises a transparent plano-parallel plate in a portion of the image field of said grating member.

9. Apparatus for measuring displacement of an object comprising a grating member secured to said object and displaceable therewith, a rotatable drum grating having a light source therein and means for rotating said drum at a constant angular velocity, means including said grating member for producing at least one interference pattern, means for projecting an image of said drum onto said means including said grating member for producing a first light beam, means for producing a second light beam from said interference pattern, and photoelectric means for detecting said first and second light beams.

10. Apparatus for measuring displacement of an object comprising a first diffraction grating member secured to said object and movable therewith, a rotatable drum grating having a light source therein and means for rotating said drum at a constant angular velocity, means for projecting an image of said drum grating onto said first grating member through a second juxtaposed diffraction grating member for producing a light beam on a photoelectric element, said second diffraction grating member having a grating period differing from the grating period of said first grating member, means for projecting an image of said drum grating onto a third grating member for producing another light beam on another photoelectric element, said third grating member having a grating period equal to the grating period of said drum grating.

11. Apparatus for measuring displacement of an object comprising a first diffraction grating member secured to said object and movable therewith, a rotatable drum grating having a light source therein and means for rotating said drum at a constant angular velocity, means projecting an image of said drum grating onto said first grating member through a second juxtaposed grating portion having a grating period greater than the grating period of said first grating member for producing a first light beam, said means for projecting said image of said drum grating also projecting said drum grating image onto said first grating through another grating portion having a grating period smaller than said grating period of said first grating member for producing a second light beam, and first and second photoelectric means illuminated by said first and second light beams respectively.

12. Apparatus according to claim 11 wherein said second grating portion and said another grating portion are inclined with respect to said first grating member and inclined in opposite directions with respect to each other.

13. Apparatus for measuring displacement of an object comprising a first diffraction grating member secured to said object and movable therewith, a rotatable drum grating having a light source therein and means for rotating said drum at a constant angular velocity, means projecting an image of said drum grating onto said first grating member, means including a transparent planoparallel plate projecting a first interference pattern onto a portion of said first grating member on the side thereof opposite said drum image for producing a first light beam, said last mentioned means excluding said planoparallel plate projecting a second interference pattern onto another portion of said opposite side of said first grating member for producing a second light beam, and photoelectric means for detecting said light beams.

References Cited by the Examiner

UNITED STATES PATENTS

| | | | |
|---|---|---|---|
| 2,596,752 | 5/52 | Williams | 250—232 X |
| 2,788,519 | 4/57 | Caldwell | 250—233 X |
| 2,857,802 | 10/58 | Cail | 250—237 |
| 2,861,345 | 11/58 | Spencer | 250—237 X |
| 2,886,717 | 5/59 | Williamson et al. | 250—237 X |
| 2,945,132 | 7/60 | Schuch | 250—237 X |
| 3,076,374 | 2/63 | De Neer Gaard | 88—14 |

RALPH G. NILSON, *Primary Examiner.*

WALTER STOLWEIN, *Examiner.*